(12) United States Patent
Nakamura

(10) Patent No.: US 11,003,172 B2
(45) Date of Patent: May 11, 2021

(54) MACHINE TOOL

(71) Applicant: NAKAMURA-TOME PRECISION INDUSTRY CO., LTD., Ishikawa (JP)

(72) Inventor: Yoshikatsu Nakamura, Hakusan (JP)

(73) Assignee: NAKAMURA-TOME PRECISION INDUSTRY CO., LTD., Ishikawa (JP)

( * ) Notice: Subject to any disclaimer, the term of this patent is extended or adjusted under 35 U.S.C. 154(b) by 0 days.

(21) Appl. No.: 16/523,194

(22) Filed: Jul. 26, 2019

(65) Prior Publication Data

US 2020/0041983 A1 Feb. 6, 2020

(30) Foreign Application Priority Data

Aug. 1, 2018 (JP) .............................. JP2018-144887

(51) Int. Cl.
*G05B 19/416* (2006.01)
*B23Q 17/12* (2006.01)

(52) U.S. Cl.
CPC ......... *G05B 19/4163* (2013.01); *B23Q 17/12* (2013.01); *G05B 2219/37434* (2013.01); *G05B 2219/41256* (2013.01)

(58) Field of Classification Search
CPC .. B23Q 17/0976; B23Q 17/12; G05B 19/404; G05B 19/4065; G05B 19/4163; G05B 19/4166; G05B 2219/37434; G05B 2219/37513; G05B 2219/41256
See application file for complete search history.

(56) References Cited

U.S. PATENT DOCUMENTS

| | | | | |
|---|---|---|---|---|
| 4,563,897 A | * | 1/1986 | Moore | ............... G05B 19/4065 73/587 |
| 4,758,964 A | * | 7/1988 | Bittner | ..................... G01H 1/00 340/680 |
| 5,170,358 A | * | 12/1992 | Delio | ................. G05B 19/4163 173/2 |
| 2012/0065766 A1 | | 3/2012 | Yoshino et al. | |

FOREIGN PATENT DOCUMENTS

JP  2010-105160 A  5/2010

* cited by examiner

*Primary Examiner* — Chad G Erdman
(74) *Attorney, Agent, or Firm* — Oliff PLC

(57) ABSTRACT

A machine tool includes: a main spindle that holds a work piece; a tool holding unit that holds a tool for processing the work piece; a detection unit that detects vibration generated during processing of the work piece; and a processor that controls machining of the work piece performed by the tool, in which the processor compares a detected value detected by the detection unit with a predefined threshold value, interrupts the machining by releasing contact between the work piece and the tool at time of generation of chatter vibration or when there is a sign of the generation of the chatter vibration in which the detected value exceeds the threshold value, and analyzes the chatter vibration while the machining is being interrupted on basis of the detected value detected by the detection unit before the interruption.

3 Claims, 5 Drawing Sheets

MACHINE TOOL

The contents of Japanese Patent Application No. 2018-144887 filed on Aug. 1, 2018 are incorporated in the present application.

BACKGROUND

This disclosure relates to a machine tool capable of addressing chatter vibration that may be generated at the time of machining.

When chatter vibration is generated for some reason at the time of machining, the chatter vibration not only affects the processing quality of a work piece, but also causes wear and damage of a tool.

For example, JP-A-2010-105160 discloses a feature of detecting the chatter vibration by an accelerometer, and adjusting the rotating speed of a cutting tool and the like in accordance with the frequency of the chatter vibration that is calculated.

DESCRIPTION OF EXEMPLARY EMBODIMENTS

Figure 1:
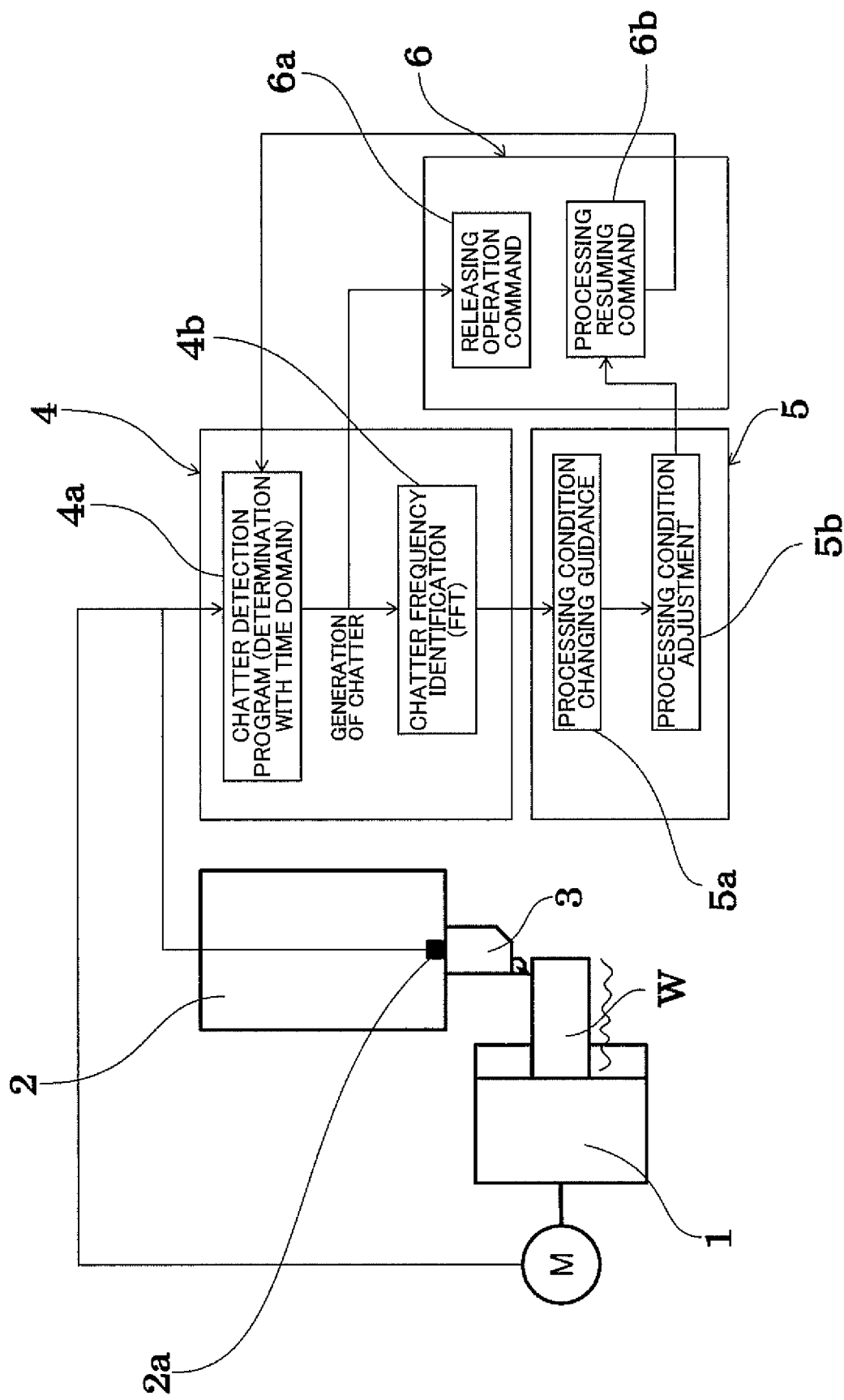
FIG. 1 illustrates a first system configuration example.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

An object of this disclosure is to provide a machine tool capable of maintaining the processing quality of a work piece and suppressing wear and damage of a tool.

In accordance with one of some embodiments, there is provided a machine tool, comprising:

a main spindle that holds a work piece;

a tool holding unit that holds a tool for processing the work piece so that the tool is able to come into and out of contact with the work piece;

a detection unit that detects vibration generated during processing of the work piece; and a processor that controls machining of the work piece performed by the tool, wherein the processor compares a detected value detected by the detection unit with a predefined threshold value, interrupts the machining by releasing contact between the work piece and the tool at time of generation of chatter vibration or when there is a sign of the generation of the chatter vibration in which the detected value exceeds the threshold value, and analyzes the chatter vibration while the machining is being interrupted on basis of the detected value detected by the detection unit before the interruption.

Now, the detection unit detects the vibration generated on the work piece, the tool, a tool rest, and the like when the work piece is machined by the tool.

The detection unit can be a contact sensor such as an accelerometer and an acceleration pickup (vibration pickup), or a non-contact sensor such as an eddy current-type non-contact sensor and a laser non-contact sensor. Alternatively, the detection unit may detect indirect displacement such as the load current change of a servomotor and the like, the change of position deviation and rotational deviation, and the change of sound.

The threshold value to be compared with the detected value from the detection unit is set to a value obtained when the chatter vibration generated on the processing section of the work piece and the like is generated or a value equivalent to a sign of the chatter vibration.

By setting the threshold value to be compared with the detected value, the processor can detect the start of the generation of the chatter vibration and a sign of chatter vibration. When the chatter vibration or a sign thereof is detected, the processor can directly interrupt the machining by releasing the contact between the work piece and the tool. The processor can analyze the chatter vibration while the machining is interrupted on the basis of the detected value detected by the detection unit before the interruption.

In the related art, during the analysis of the frequency of the chatter vibration, the machining is continued while the chatter vibration is generating. Therefore, there has been a fear that a work piece with a processing defect is generated or damage is caused in the tool during the analysis.

According to this embodiment, the machining can be prevented from proceeding during the analysis of the chatter vibration. As a result, the generation of a defect in the work piece, and the wear and damage of the tool can be reduced.

In accordance with one of some embodiments, the machine tool may further comprise:

a guiding unit that guides change of a processing condition set by the processor on basis of an analysis result of the chatter vibration; and a changing unit in which the processing condition is changed by an operator, wherein the processor resumes the machining after the processing condition is changed.

As a result, the machining can be resumed after the processing condition for suppressing the chatter vibration is set. Therefore, the recurrence of the chatter vibration after the resuming can be prevented.

In accordance with one of some embodiments, there is provided the machine tool, wherein the processor may determine whether the processing condition for resumed machining is heavy cutting in which a feed amount of the tool in a radial direction of the work piece is larger than a reference value, or light cutting in which the feed amount is smaller than the reference value, and starts reprocessing from a position at which the machining has been interrupted when the processing condition is determined to be the heavy cutting, and may start reprocessing from a starting point of a processing path in which the machining has been interrupted when the processing condition is determined to be the light cutting.

As a result, in particular, for heavy cutting, the machining can be resumed from the interrupted position, and processing time loss can be reduced. In addition, even if there are chatter marks before interruption, it is possible to cut and eliminate the chatter marks by light cutting for finishing performed after heavy cutting. For light cutting, since the reprocessing starts from the starting point of the processing path, the processing quality can be made uniform.

Exemplary embodiments are described below. Note that the following exemplary embodiments do not in any way limit the scope of the content defined by the claims laid out herein. Note also that all of the elements described in the present embodiment should not necessarily be taken as essential elements.

A machine tool according to this embodiment is described with reference to the drawings.

FIG. 1 illustrates a first system configuration example.

The machine tool of this embodiment is a lathe, for example. A main spindle 1 holds a work piece W by a chuck, and is controlled so as to be rotated by a motor.

A tool 3 is mounted on a tool main spindle 2, and the tool main spindle 2 performs lathe turning of the work piece W by the tool 3. The tool main spindle 2 feeds the tool 3 in the radial direction and the axial direction of the work piece W. By the feeding in the radial direction of the work piece W, the tool main spindle 2 can cause the tool 3 to come into and out of contact with the work piece W.

A control system of the machine tool includes a calculation apparatus 4, an operation panel 5, and an NC apparatus 6. Note that the calculation apparatus 4 and the NC apparatus 6 are processors that control the machining of the work piece W by the tool 3.

In this embodiment, a detection unit 2a for detecting the chatter vibration is mounted on the tool main spindle 2, for example.

The detection unit 2a detects the generation of the chatter vibration on a target such as the work piece W, for example, at the time of machining. The detection unit 2a only needs to detect time-series displacement of the target in accordance with the generation of the chatter vibration. Therefore, the detection unit 2a may not only directly detect the chatter vibration from the output change of contact sensors such as an accelerometer and an acceleration pickup (vibration pickup), but also indirectly detect the chatter vibration from the output change of non-contact sensors. The non-contact sensors may include a laser non-contact sensor, and a microphone and the like for outputting sound change of the target. The non-contact sensors may output the load current change of a servomotor, the change of the position deviation or the rotational deviation of the target.

Figure 5:
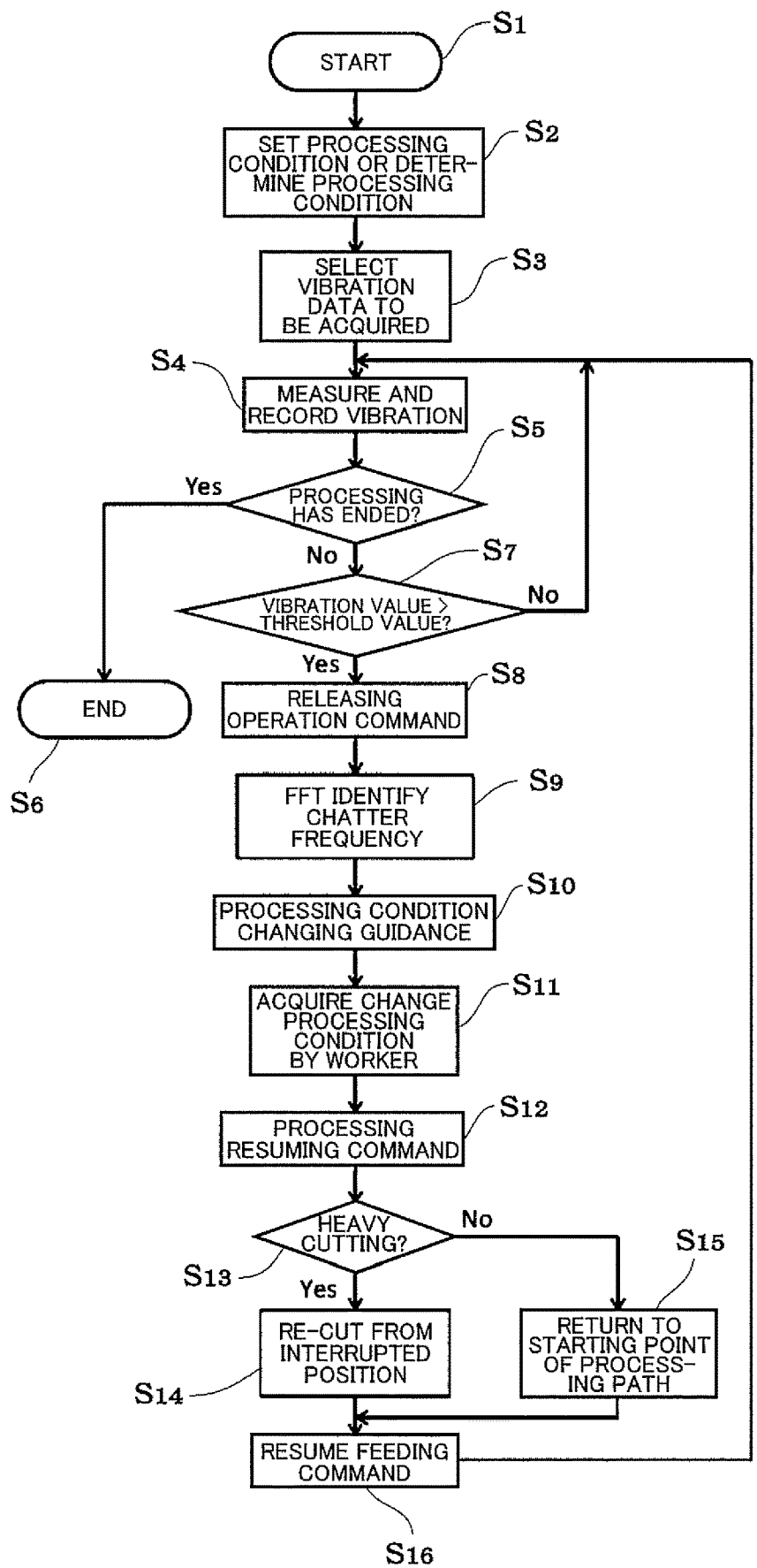
FIG. 5 illustrates a flowchart example.

Next, description is made with reference to the flowchart of FIG. 5 that is the operating procedure of a processor including the calculation apparatus 4 and the NC apparatus 6.

When a processing starting command is acquired (S1), the processing condition is set or determined (S2), and vibration data to be acquired by the detection unit 2a is selected with respect to the content of the processing condition (S3). Note that the work piece W that is held and rotated by the main spindle 1 is machined, for example, cut by the tool 3 held by the tool main spindle 2 in accordance with the processing condition.

The calculation apparatus 4 has a chatter detection program 4a, and executes the chatter detection program 4a. When the acceleration pickup is selected in Step S3, for example, the calculation apparatus 4 starts the measurement of the vibration and the recording thereof (S4). In other words, electrical signals detected by the detection unit 2a in time series are taken into the calculation apparatus 4 and are recorded. The calculation apparatus 4 may display the vibration data in time series.

The calculation apparatus 4 executes Step S7 as long as it is not determined that the processing has ended in Step S5. Now, the calculation apparatus 4 includes comparison means. The comparison means of the calculation apparatus 4 compares vibration values (amplitudes) detected by the detection unit 2a in time series with a threshold value that is set and input in advance (S7).

When the vibration values (amplitudes) are equal to or less than the threshold value (the determination in Step S7 is NO), Steps S4, S5, and S7 are repeatedly executed by the chatter detection program 4a while the processing is continued. The execution of the chatter detection program 4a ends when the processing ends (the determination in Step S5 is YES) (S6).

Meanwhile, when the generation of the chatter vibration or a sign of chatter vibration are detected by the calculation apparatus 4, a notification is given to the NC apparatus 6 from the calculation apparatus 4 (comparison means). The NC apparatus 6 can include interruption means. The interruption means outputs a releasing operation command 6a to the tool main spindle 2 (S8). As a result, the tool 3 held by the tool main spindle 2 is separated from the work piece W, and the contact between the tool 3 and the work piece W is released, thereby interrupting the machining.

The calculation apparatus 4 can include analysis means 4b. While the machining is being interrupted, the analysis means 4b of the calculation apparatus 4 analyzes the frequency of the vibrations detected in time series by the detection unit 2a before the interruption by way of FFT, for example, to thereby identify the chatter frequency and the like (S9).

The calculation apparatus 4 can include calculation means that acquire the processing condition for suppressing the chatter generation on the basis of the result of the FFT analysis.

The calculation apparatus 4 displays the processing condition calculated by the calculation means on a guiding unit (display unit) of the operation panel 5 as a processing condition changing guidance 5a (S10).

The content of change of the processing condition input to a change unit (operation unit) of the operation panel 5 by an operator (worker) with reference to the display is acquired by the NC apparatus 6 (S11).

The NC apparatus 6 can include resume means. When the content of change of the processing condition is acquired, the resume means outputs a processing resuming command (S12).

Now, in the machining of the work piece W, the processing condition may specify the amount by which the tool 3 held by the tool main spindle 2 is fed in the radial direction of the work piece W and the amount by which the tool 3 held by the tool main spindle 2 is fed in the axial direction of the work piece W.

In this embodiment, the calculation apparatus 4 or the NC apparatus 6 can include decision means that judges following Step S13 and decides whether heavy cutting or light cutting. The resume means may specify the resuming position of the machining on the basis of the decision in Step S13 performed by the decision means. The resume means can start the re-cutting from the position at which the processing has been interrupted for heavy cutting such as rough cutting in which the feed amount of the tool 3 in the radial direction of the work piece W is larger than a reference value (the determination in S13 is YES) (S14). The resume means can return the cutting to the starting point of the processing path before the generation of the chatter vibration is started for light cutting such as finishing processing in which the feed amount of the tool in the radial direction of the work piece W is smaller than or equal to the reference value (the determination in S13 is NO) (S15).

The calculation apparatus 4 or the NC apparatus 6 can adjust the machining position at the time of resuming, and output the resuming command for the machining to a driving unit of the tool main spindle 2 and the like via the NC apparatus 6 (S16). As a result, the machining of the work piece W performed by the tool 3 held by the tool main spindle 2 is resumed.

Figure 2:
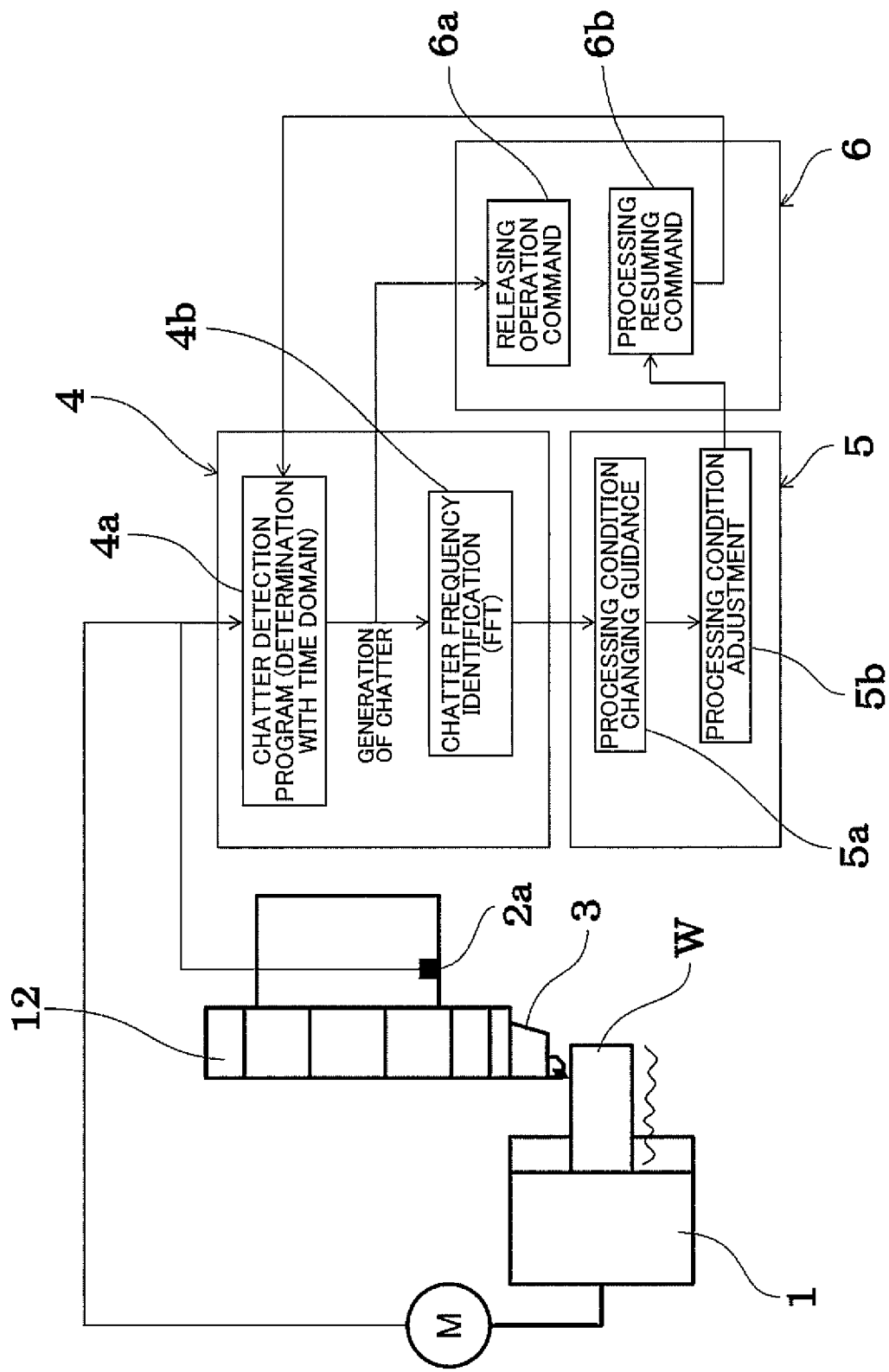
FIG. 2 illustrates a second system configuration example.
Figure 3:
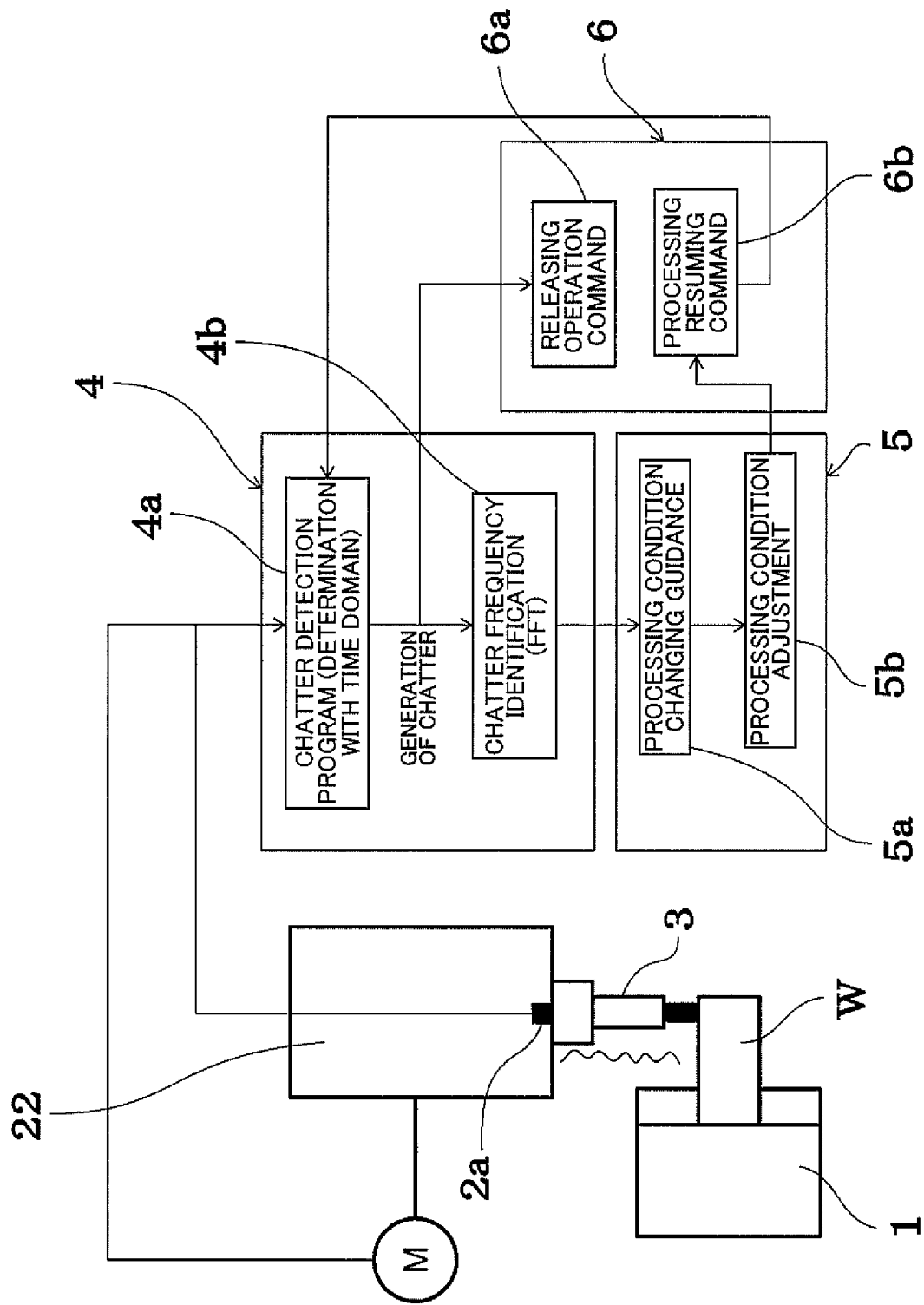
FIG. 3 illustrates a third system configuration example.
Figure 4:
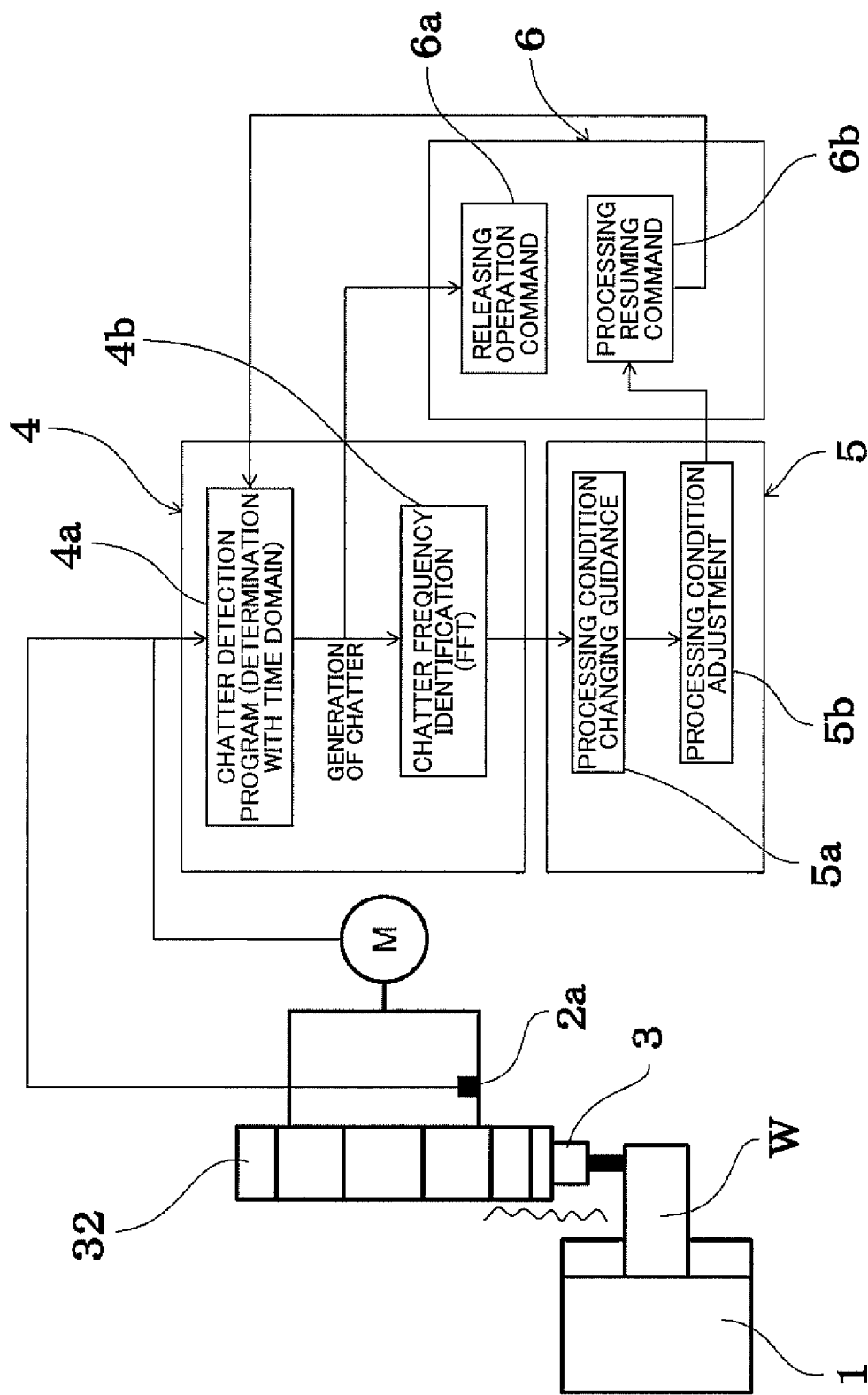
FIG. 4 illustrates a fourth system configuration example.

The type of machining is not limited in this disclosure. For example, as illustrated in FIG. 2, the machining may be lathe turning using a turret 12 instead of the tool main spindle 2 in FIG. 1. Alternatively, as illustrated in FIG. 3, the machining may be milling in which the rotating tool 3 is mounted on the tool main spindle 22. Alternatively, as illustrated in FIG. 4, the machining may be milling in which the rotating tool 3 is mounted on a turret 32. In the case of milling, the vibration of the rotating tool 3 is preferred to be detected.

What is claimed is:

1. A machine tool comprising:
   a main spindle that holds a work piece;
   a tool holder that holds a tool for processing the work piece so that the tool is configured to come into and out of contact with the work piece;
   a detector that detects vibration generated during processing of the work piece;
   a display that displays a processing condition;
   an operation device that changes the processing condition by input from an operator; and
   a processor that controls machining of the work piece performed by the tool, and the processor:
      compares a detected value detected by the detector with a predefined threshold value,
      interrupts the machining by releasing contact between the work piece and the tool at time of generation of chatter vibration or when a sign of the generation of the chatter vibration exists in which the detected value exceeds the threshold value,
      analyzes the chatter vibration while the machining is being interrupted based on the detected value detected by the detector before the interruption,
      calculates the processing condition to suppress the generation of the chatter vibration based on an analysis result of the chatter vibration,
      displays the processing condition to the display,
      resumes the machining after the processing condition is changed via the operation device operated by the operator,
      determines whether the processing condition for resumed machining is (i) heavy cutting in which a feed amount of the tool in a radial direction of the work piece is larger than a reference value, or (ii) light cutting in which the feed amount is smaller than the reference value, and
      starts reprocessing from a position at which the machining has been interrupted when the processing condition is determined to be the heavy cutting, and starts reprocessing from a starting point of a processing path in which the machining has been interrupted when the processing condition is determined to be the light cutting.

2. The machine tool according to claim 1, wherein the processor calculates the processing condition to suppress the generation of the chatter vibration based on a Fast Fourier Transform (FFT) analysis result of the chatter vibration.

3. The machine tool according to claim 1, wherein the processing condition specifies the feed amount by which the tool held by the tool holder is fed in the radial direction of the workpiece and the feed amount by which the tool held by the tool holder is fed in the axial direction of the workpiece.

* * * * *